(12) United States Patent
Wahrenberg et al.

(10) Patent No.: US 10,719,907 B2
(45) Date of Patent: Jul. 21, 2020

(54) METHOD OF, AND APPARATUS FOR, DATA PROCESSING

(71) Applicant: Canon Medical Systems Corporation, Otawara-shi (JP)

(72) Inventors: Magnus Wahrenberg, Edinburgh (GB); Ross Davies, Edinburgh (GB)

(73) Assignee: Canon Medical Systems Corporation, Otawara-shi (JP)

( * ) Notice: Subject to any disclaimer, the term of this patent is extended or adjusted under 35 U.S.C. 154(b) by 31 days.

(21) Appl. No.: 15/906,664

(22) Filed: Feb. 27, 2018

(65) Prior Publication Data

US 2019/0266696 A1 Aug. 29, 2019

(51) Int. Cl.
*G06T 1/60* (2006.01)
*G06T 1/20* (2006.01)
*G06T 15/04* (2011.01)

(52) U.S. Cl.
CPC .......... *G06T 1/60* (2013.01); *G06T 1/20* (2013.01); *G06T 15/04* (2013.01)

(58) Field of Classification Search
CPC ......... G06T 1/60; G06T 1/20; G06T 2200/04; G06T 2207/10024; G06T 2207/10101; G06F 19/321
See application file for complete search history.

(56) References Cited

U.S. PATENT DOCUMENTS

| | | | |
|---|---|---|---|
| 5,845,083 A * | 12/1998 | Hamadani | H04N 19/61 709/231 |
| 6,292,194 B1 * | 9/2001 | Powell, III | G06T 11/001 345/582 |
| 7,986,325 B1 * | 7/2011 | Gold | G06T 15/04 345/506 |
| 8,131,041 B2 | 3/2012 | Ter Mors | |
| 9,367,948 B2 | 6/2016 | Peng et al. | |
| 2005/0052449 A1 * | 3/2005 | Emberling | G06F 12/0859 345/418 |

(Continued)

FOREIGN PATENT DOCUMENTS

JP 2017-85285 A 5/2017

OTHER PUBLICATIONS

Linz et al., Effective Multi-resolution Rendering and Texture compression for Captured Volumetric Trees. Eurographics Workshop on Natural Phenomena, Sep. 2006, Vienne, Austria. pp. 83-90, 10.2312/NPH/NPH06/083-090. Inria-00606776. (Year: 2006).*

(Continued)

*Primary Examiner* — Maurice L. McDowell, Jr.
*Assistant Examiner* — Donna J. Ricks
(74) *Attorney, Agent, or Firm* — Oblon, McClelland, Maier & Neustadt, L.L.P.

(57) ABSTRACT

A data processing apparatus comprises a first memory configured to store at least one data set; a second memory configured to store a multi-channel atlas texture; and processing circuitry configured to: store at least one region of the at least one data set in one or more corresponding regions of the multi-channel atlas texture by altering data values of the at least one region of the at least one data set in accordance with a transformation vector comprising at least one channel weight and/or at least one numerical offset value; and reconstruct data values from the altered data values by transforming the altered data values using the transformation vector.

21 Claims, 6 Drawing Sheets

(56) References Cited

U.S. PATENT DOCUMENTS

| | | | |
|---|---|---|---|
| 2005/0143654 A1* | 6/2005 | Zuiderveld | G06T 15/08 600/443 |
| 2008/0094411 A1* | 4/2008 | Parenteau | G06T 15/503 345/592 |
| 2014/0022252 A1 | 1/2014 | Watanabe et al. | |
| 2016/0005218 A1* | 1/2016 | Day | G06T 15/08 345/426 |

OTHER PUBLICATIONS

Johanna Beyer, et al., "A Survey of GPU-Based Large-Scale Volume Visualization", Eurographics Conference on Visualization (EuroVis), 2014, 19 Pages.

"Texture", OpenGL Wiki, https://www.khronos.org/opengl/wiki/Texture, 2018, 8 pages.

"5.3.2, Device Memory Accesses", CUDA Toolkit Documentation, http://docs.nvidia.com/cuda/cuda-c-programming-guide/index.html#device-memory-accesses, 2018, 6 pages.

"Chapter 9: Texture Mapping", OpenGL Programming Guide, http://www.glprogramming.com/red/chapter09.html, 2018, 35 pages.

"3.2.11.1 Texture Memory", CUDA Toolkit Documentation, http://docs.nvidia.com/cuda/cuda-c-programming-guide/index.html#texture-memory, 2018, 16 pages.

"Image Entropy", Cassini Lossy Compression, http://www.astro.cornell.edu/research/projects/compression/entropy.html, 2018, 1 page.

* cited by examiner

METHOD OF, AND APPARATUS FOR, DATA PROCESSING

FIELD

Embodiments described herein relate generally to a method of, and apparatus for, processing data, for example processing data using a graphics processing unit (GPU).

BACKGROUND

In some data processing methods, a Graphics Processing Unit (GPU) is used to perform volume rendering of volumetric data, for example volumetric imaging data obtained from a medical imaging scanner.

GPU volume rendering may entail making use of a GPU to accelerate standard volume rendering techniques, for example Multi-Planar Reformatting (MPR), Shaded Volume Rendering (SVR), Intensity Projection (IP) or slab rendering.

A typical GPU has a parallel architecture which allows the same computation to be run on different inputs many times, simultaneously. For example, the GPU may compute every pixel of an image at the same time, by applying the same algorithm at each pixel position.

A typical GPU has dedicated graphics memory, which may be located on a graphics card. For data to be operated on by a typical GPU, that data must be accessible in the dedicated graphics memory. Input data is uploaded to the graphics card for it to be operated on.

The GPU stores textures which may be, for example, one-dimensional (1D), two-dimensional (2D), or three-dimensional (3D) textures. Each element (in the case of a 1D texture), pixel (in the case of a 2D texture) or voxel (in the case of a 3D texture) may have a number of channels of some pre-defined bit depth. For example, a GPU may store textures for which each element, pixel or voxel has four 8-bit channels, which may be referred to as 8-bit red, green, blue, alpha (R8G8B8A8).

The term image may be used to refer to an array of pixels or voxels having a known dimensionality (for example, 1D, 2D or 3D). In general, an image has a known size and format.

A texture may be considered to be a container for one or more images. A texture may have a particular data format or layout. For example a texture may have a defined dimensionality (1D, 2D or 3D). A texture may have a defined channel layout, for example a fixed number and type of channels. A texture may have a defined size.

Characteristics of a texture may constrain the images that can be contained within the texture. For example, characteristics of the texture may determine how images are arranged within the texture, a size of images that can be contained in the texture, and/or a format of images that can be contained in the texture.

Definitions of a texture may be found at, for example, the OpenGL wiki (https://www.khronos.org/opengl/wiki/Texture), the Cuba programming guide (http://docs.nvidia.com/cuda/cuda-c-programming-guide/index.html#device-memory-accesses) and the Texture Mapping chapter of the OpenGL red book (http://www.glprogramming.com/red/chapter09.html).

GPUs may make the sampling of textures fast by using caching and dedicated interpolation hardware. Typically, when sampling from a texture, the GPU is able to perform linear interpolation very quickly. Individual texture samples are cached, so that subsequent fetches are very fast.

Traditional volume rendering may involve uploading an entire volume to the GPU's dedicated memory as a volume texture.

It is becoming increasingly common to use large volumes. For example, in the case of medical imaging, increased medical scanner resolution may result in very large imaging volumes. Some volumes may be large enough that they cannot fit into the dedicated graphics memory of a GPU in their entirety.

It is also becoming common to operate multi-user enterprise systems. In multi-user enterprise systems, a computing resource may be shared between multiple users. In some circumstances, multi-user enterprise systems may have an even more limited memory budget per-user than single-user systems.

GPU rendering may need to adapt to a changing environment.

It is known to implement virtual texturing when uploading data to a GPU. Virtual texturing may reduce an amount of data that is held on a GPU to render a single frame.

FIG. 1 is a schematic diagram which is representative of a virtual texturing method in which data from a source texture 10 is stored in an atlas texture 20 on a GPU.

The source texture 10 and atlas texture 20 are each represented by a respective box in FIG. 1.

In the example of FIG. 1, the source texture 10 is a large texture. For example, the source texture 10 may be a texture that is too large to fit within the graphics memory of the GPU on which the atlas texture 20 is stored.

The source texture 10 is divided into a plurality of regions 12, which may also be referred to as blocks or bricks. In the example of FIG. 1, the regions are all of the same size and shape, for example cubic. The regions are shown as regular square boxes in FIG. 1.

The atlas texture 20 is smaller than the source texture 10. The atlas texture 20 is configured to store the same data type as the source texture 10.

The atlas texture 20 is divided into regions 22, for example cubic regions. In the example of FIG. 1, regions 22 are of the same size and shape as the regions 12 of the source texture 10.

A precomputation is performed in which processing circuitry precomputes the regions 12 of the source texture 10 that are needed in order to render a given image, which may be referred to as a frame.

In many cases, only a part of the source texture 10 may be required in order to render a given frame. In one example, only one feature represented in the source texture 10 is of interest and other features may be omitted from the rendering. In another example, some features represented in the source texture 10 are not visible from a viewpoint from which the frame is to be rendered because they are occluded by other features. Regions that are representative of the occluded features may be omitted from the rendering.

In the example of FIG. 1, a region of interest 14 is determined in the source texture 10. The region of interest 14 is indicated in FIG. 1 by an outlined box overlaying the source texture 10.

Regions 12 that at least partially fall within the region of interest 14 are selected for rendering. Such regions 12 are shaded in FIG. 1 and are given the reference numeral 16. The selected regions 16 may also be referred to as useful regions.

Only the selected regions 16 are uploaded to the GPU. The selected regions 16 are uploaded into the GPU by mapping the selected regions 16 into the atlas texture 20. Each selected region 16 of the source texture 10 is mapped to a corresponding region 24 of the atlas texture 20. Regions 24 of the atlas texture 20 onto which selected regions 16 of the source texture 10 are mapped are indicated by shading. Arrows 26, 28 show the mapping of two of the selected regions 16 of the source texture 10 to corresponding regions 24 of the atlas texture 20.

In mapping from the source texture 10 to the atlas texture 20, regions may be rearranged, for example reordered. In the example of FIG. 1, a diagonally-arranged set of selected regions 16 of the source texture 10 is mapped onto successive full lines of regions 24 of the atlas texture 20.

The processing circuitry also uploads to the GPU an index which stores the mapping of selected regions 16 of the source texture 10 to regions 24 of the atlas texture 20. For each selected region 16, the index stores a position of the respective corresponding region 24 of the atlas texture 20. The index is capable of mapping any voxel of the selected regions 16 of the source texture 10 into the atlas texture.

By mapping only the selected regions 16 to the atlas texture 20, GPU operations (for example, interpolation) may be performed by the GPU only on data from the selected regions 16. The use of an atlas texture 20 may greatly reduce the memory footprint used in rendering a frame in the case where rendering that frame requires only a subset of the complete source volume data.

In the example described above with reference to FIG. 1, it is required that the source texture 10 has the same data format as the atlas texture 20. For example, the source texture 10 and the atlas texture 20 may each comprise 8 bit data.

FIG. 2 is a schematic illustration of channel packing, which may also be called multimaps. In the example shown in FIG. 2, two grayscale source images 30, 32 (which may also be called source textures or source data sets) are packed into two channels of a further image 34 on the GPU.

Each of the source images 30, 32 is a grayscale image having only one channel of data. Each source image 30, 32 comprises 8-bit data.

Grayscale data from the first source image 30 is stored on the red channel of the further image 34. Grayscale data from the second source image 32 is stored on the green channel of the further image 34.

In FIG. 2, a first type of shading represents data from the first source image 30 and a second type of shading represents data from the second source image 32. Both types of shading are shown for the further image 34 to show that data from both source images 30, 32 is stored there.

Sampling may be performed by selecting the correct channel for the data that is desired (for example, the red channel for data from the first source image 30 and the green channel for data from the second source image 32).

Channel packing may exploit GPU texture caching behavior when a single GPU thread must access multiple textures at the same point. Textures using multiple components (for example, RGBA and/or further components, for example unrelated unnamed components) may be stored in an interleaved order. Storing components in an interleaved order may make it easy for a program or GPU hardware to read multiple components at once. Channel packing may exploit the fact that reading interleaved channels (for example, reading up to four interleaved channels) may take almost the same time as reading one channel. Reading one channel from each of four different images may take on the order of four times as long as reading one channel from one image.

In the example of FIG. 2, the data layout and type of the further image 34 is the same as that of the source images 30, 32. The source images 30, 32 and further image 34 each comprise 8-bit data. The data layout and typing are static.

BRIEF DESCRIPTION OF DRAWINGS

Embodiments are now described, by way of non-limiting example, and are illustrated in the following figures, in which.

DETAILED DESCRIPTION

Certain embodiments provide a data processing apparatus comprising: a first memory configured to store at least one data set; a second memory configured to store a multi-channel atlas texture; and processing circuitry configured to: store at least one region of the at least one data set in one or more corresponding regions of the multi-channel atlas texture by altering data values of the at least one region of the at least one data set in accordance with a transformation vector comprising at least one channel weight and/or at least one numerical offset value; and reconstruct data values from the altered data values by transforming the altered data values using the transformation vector.

Certain embodiments provide a data processing method comprising: storing at least one data set in a first memory; storing at least one region of the at least one data set in one or more corresponding regions of a multi-channel atlas texture stored in a second memory, wherein the at least one region of the at least one data set is stored in the one or more corresponding regions of the multi-channel atlas texture by altering data values of the at least one region of the at least one data set in accordance with a transformation vector comprising at least one channel weight and/or at least one numerical offset value; and reconstructing data values from the altered data values by transforming the altered data values using the transformation vector.

Figure 1:
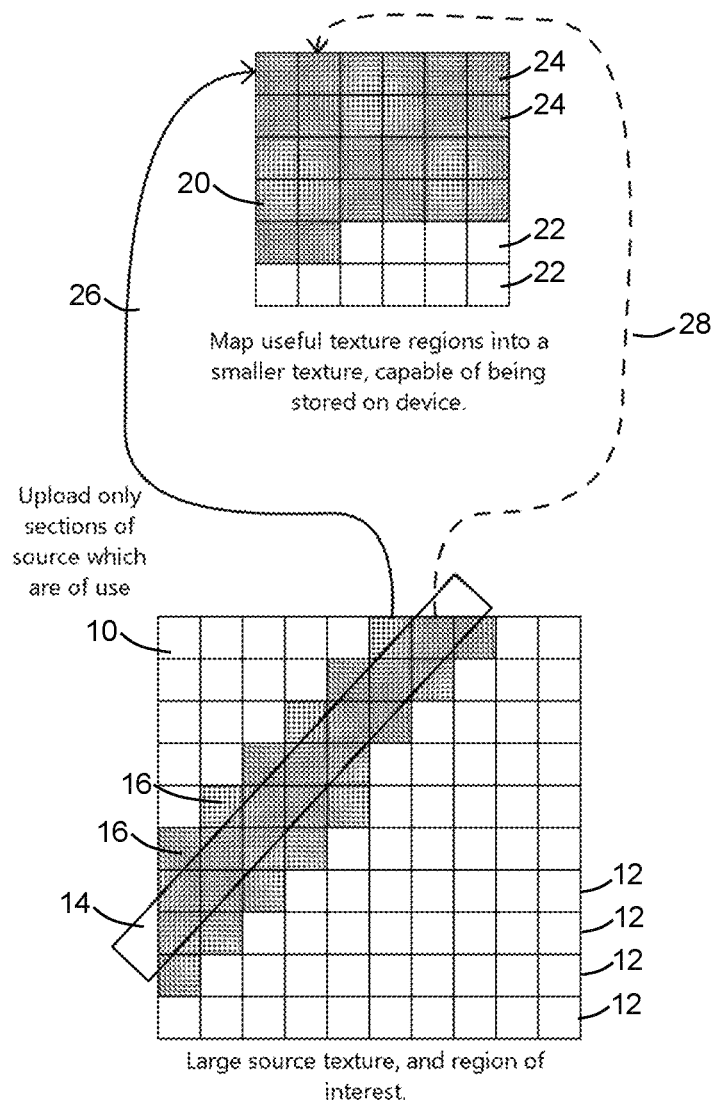
FIG. 1 is a schematic diagram showing a source texture and atlas texture.
Figure 2:
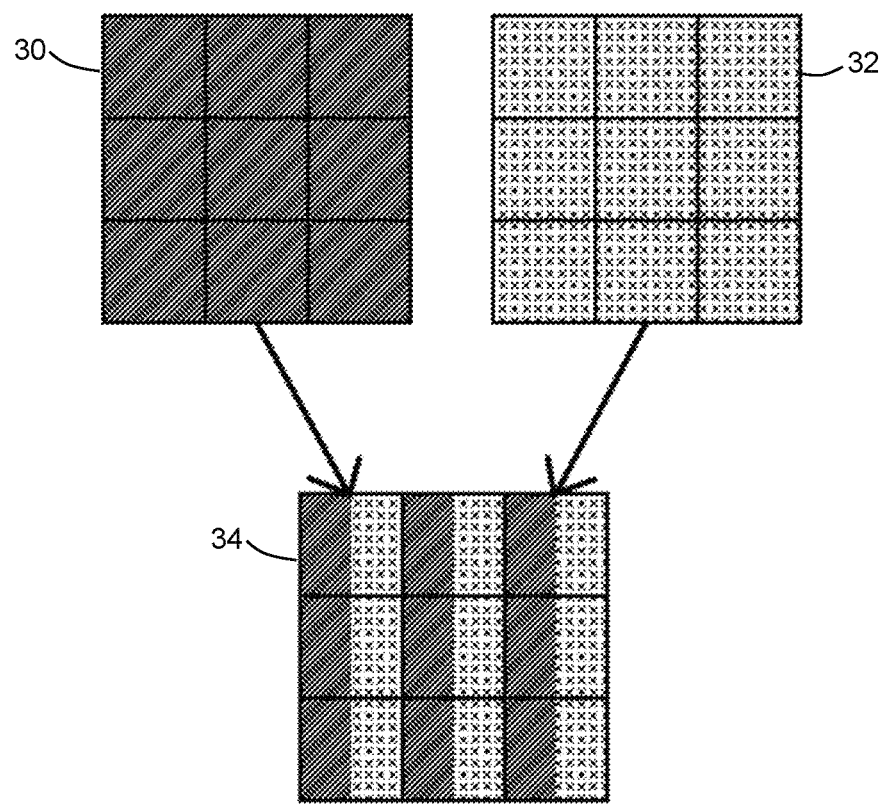
FIG. 2 is a schematic diagram representing channel packing.
Figure 3:
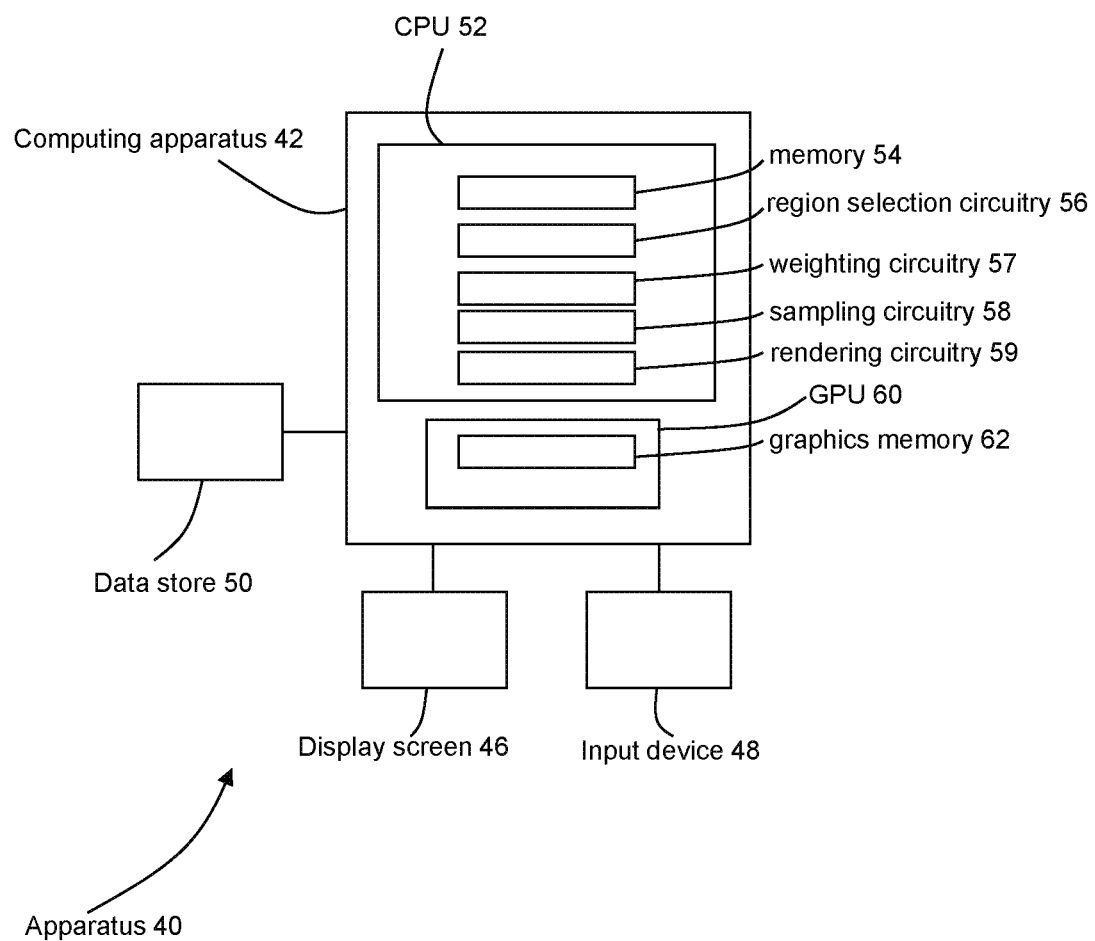
FIG. 3 is a schematic diagram of an apparatus in accordance with an embodiment.

An apparatus 40 according to an embodiment is illustrated schematically in FIG. 3.

In the embodiment of FIG. 3, the apparatus 40 is configured to perform volume rendering of imaging data acquired by any one or more of a plurality of medical imaging scanners (not shown). The medical imaging scanners may comprise at least one of a CT (computed tomography) scanner, an MRI (magnetic resonance imaging) scanner, an X-ray scanner, a PET (positron emission tomography) scanner, a SPECT (single photon emission computed tomography) scanner, or an ultrasound scanner, or any suitable scanner.

Medical imaging scanners may output data of several different data types. For example, CT volumes may comprise mixed signed 16 bit and unsigned 16 bit data. Ultrasound data may comprise unsigned 8 bit data. X-ray data may often comprise unsigned 8 bit data. PET and SPECT data may often be unsigned 16 bit data.

In the present embodiment, the apparatus 40 is configured to perform volume rendering of 8 bit data, signed 16 bit data, and unsigned 16 bit data, in which the 8 bit data, signed 16 bit data and unsigned 16 bit data are stored in a common texture and processed substantially simultaneously.

The imaging data received by the apparatus 40 comprises 8 bit data, signed 16 bit data, and unsigned 16 bit data. In other embodiments, the data received by the apparatus 40 may comprise data of any one or more data types. The data received may comprise multiple data sets, each having any appropriate number of bits and/or channels. The data received by the apparatus 40 may comprise at least one of 8 bit data, 16 bit data, signed data, unsigned data, signed or unsigned integer type data, fixed point real type data, floating point data, color type data, or any other suitable data.

The apparatus 40 comprises a computing apparatus 42, which in this case is a personal computer (PC) or workstation. In other embodiments, the computing apparatus 42 may be any suitable computing apparatus, for example a server, desktop computer, laptop computer, or mobile device. In further embodiments, functionality of the computing apparatus 42 may be provided by two or more computing apparatuses.

The computing apparatus 42 is connected to a display screen 46 or other display device, and an input device or devices 48, such as a computer keyboard and mouse. In alternative embodiments, the display screen 46 is a touch screen, which also acts as an input device 48.

In the present embodiment, the computing apparatus 42 is configured to receive the medical imaging data that is to be processed from a data store 50. The data store 50 stores data acquired by the plurality of medical imaging scanners.

In alternative embodiments, the computing apparatus 42 receives data from one or more further data stores (not shown) instead of or in addition to data store 50. For example, the computing apparatus 42 may receive data from one or more remote data stores (not shown) which may form part of a Picture Archiving and Communication System (PACS) or other information system, for example a laboratory data archive, an Electronic Medical Record (EMR) system, or an Admission Discharge and Transfer (ADT) system.

Computing apparatus 42 comprises a central processing unit (CPU) 52 and a graphics processing unit (GPU) 60. The CPU 52 comprises a memory 54, and processing circuitry comprising region selection circuitry 56 configured to select regions of data to be processed, weighting circuitry 57 configured to generate transformation weights for the selected regions, sampling circuitry 58 configured to obtain samples of the selected regions, and rendering circuitry 59 configured to render an image using the samples. The GPU 60 comprises a graphics memory 62. The GPU 60 is configured to perform rapid parallel processing of data stored in the graphics memory 62, for example rapid interpolation.

The CPU 52 and GPU 60 together provide a processing resource for automatically or semi-automatically processing medical imaging data.

In the present embodiment, the circuitries 56, 57, 58, 59 are each implemented in computing apparatus 42 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 42 also includes a hard drive and other components of a PC including RAM, ROM, a data bus, an operating system including various device drivers, and hardware devices including a graphics card. Such components are not shown in FIG. 3 for clarity.

The system of FIG. 3 is configured to store data of a plurality of data types in a single atlas texture by using weighted factorized interpolation as described below with reference to FIG. 4.

Figure 4:
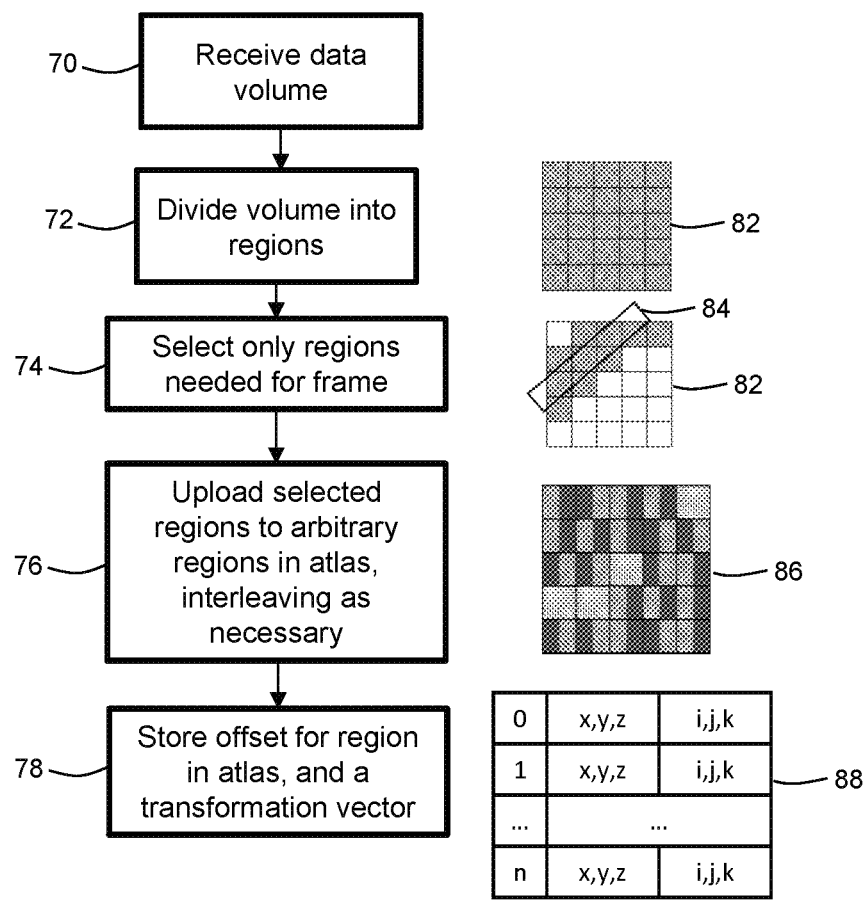
FIG. 4 is a flow chart illustrating in overview a method of an embodiment.

FIG. 4 is a flow chart illustrating in overview a method of uploading data into an atlas texture 86. For simplicity, we describe an atlas texture 86 having two 8-bit channels: an 8-bit red channel and an 8-bit green channel. In practice, the atlas texture may be likely to have four channels (red, green, blue and alpha). In other embodiments, the atlas texture may have any suitable number of channels.

FIG. 4 is a general flow chart which may refer to the uploading of any type or types of data into the atlas texture 86. We first describe the uploading of regions of a data set in general terms. We then turn to the specifics of the present embodiment, in which regions of an 8 bit data set, unsigned 16 bit data set, and signed 16 bit data set are stored in a common atlas texture 86.

Turning to FIG. 4, at stage 70, a data volume 82 is received by the CPU 52 from the data store 50. The data volume 82 may also be referred to as a data set or texture. The data volume 82 comprises a plurality of voxels each having an associated data value, for example an associated intensity value.

The entirety of the data volume 82 is stored in the memory 54 of the CPU 52.

At stage 72, the region selection circuitry 56 divides the data volume 82 into regions, which may also be referred to as blocks or bricks. In the present embodiment, the regions are cubic.

At stage 74, the region selection circuitry 56 determines the regions that are needed to render a desired frame. The region selection circuitry 56 determines the regions by identifying a region of interest 84 and selecting the regions of the data volume 82 that at least partially fall within the region of interest 84.

At stage 76, the weighting circuitry 57 uploads the selected regions to the atlas texture 86. If desired, the weighting circuitry 57 may perform interleaving as described further below.

We consider one of the selected regions. The weighting circuitry 57 stores data from the selected region in a corresponding region of the atlas texture 86. The corresponding region of the atlas texture 86 may be any region of the atlas texture 86. For example, the selected regions do not have to be stored in the atlas texture 86 in the same order as they are stored in the memory 52. The weighting circuitry 57 determines a position of the corresponding region in which the selected region has been stored.

The weighting circuitry 57 may alter data values of the selected region when storing those data values in the corresponding region of the atlas texture 86. For example, the weighting circuitry 57 may multiply or divide each of the data values by a weighting factor. The weighting circuitry 57 may add or subtract a numerical offset value from each of the data values.

In the present embodiment, the weighting circuitry 57 determines a transformation vector T for the selected region which is representative of the way in which the data values have been altered. The transformation vector T comprises a first channel weight $T^i$ relating to the red channel of the corresponding region, second channel weight $T^j$ relating to the green channel of the corresponding region and a numerical offset weight $T^k$. The transformation vector T may also be referred to as a transformation mask. The channel weights and/or numerical offset weight may also be referred to as reconstruction weights.

The transformation vector T represents a transformation that is constructed to convert any atlas sample in the atlas texture back into the corresponding source sample in the data volume 82.

The determination of the weights $T^i$, $T^j$, $T^k$ is described below with reference to a plurality of exemplary data volumes of different data types.

At stage 78, the weighting circuitry 57 stores the position (x,y,z) of the corresponding region and the transformation vector ($T^i$, $T^j$, $T^k$). The position (x,y,z) of the corresponding region may be described as a positional offset for the region, or as a mapping from the selected region to the corresponding region of the atlas texture 86.

Although the storage of only one region is described above in relation to stages 74 to 78, in practice the weighting circuitry 57 stores multiple selected regions of the data volume 82 in the atlas texture 86. The storing of each of the multiple selected regions may be performed substantially simultaneously.

For each selected region, the weighting circuitry 57 stores the position (x,y,z) of the respective corresponding region and the respective transformation vector ($T^i$, $T^j$, $T^k$). In the present embodiment, the weighting circuitry 57 stores the positions (x,y,z) and transformation vectors ($T^i$, $T^j$, $T^k$) in a transformation table 88 which is illustrated in FIG. 4. A first column of the transformation table 88 stores a region number of each of the stored regions. In practice, the first column shown in FIG. 4 may not be stored as an actual value, but may instead be implicit in the array structure (for example, the third brick is the third entry in the array). A second column stores a position of the corresponding region of the atlas texture in which each region is stored. A third column stores the transformation vector for each region.

Figure 5:
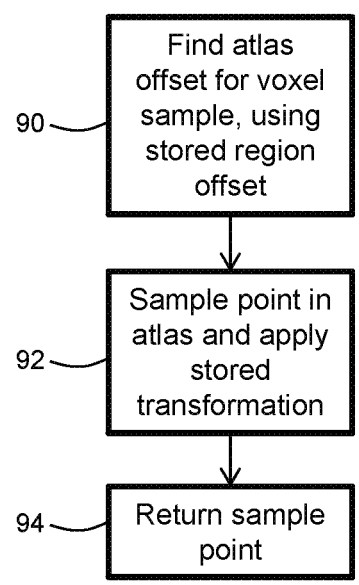
FIG. 5 is a flow chart illustrating in overview a method of an embodiment.

FIG. 5 is a flow chart illustrating in overview a method of obtaining a value for a source sample in one of the selected regions, using the data values stored in the corresponding region of the atlas texture (which may have been altered by the weighting circuitry 57 when being stored in the corresponding region) and the information stored in the transformation table. The method of FIG. 5 may be used to reconstruct imaging data from the altered version of that data that has been stored in the atlas texture. Data may be reconstructed using the transformation vectors stored in the transformation table.

At stage 90 of FIG. 5, the sampling circuitry 58 determines the position of a desired source sample in the data volume. The source sample lies within one of the selected regions of the data volume.

The sampling circuitry 58 retrieves the entry from the transformation table relating to that selected region. The entry comprises the position (x,y,z) of the corresponding region in which data from the selected region is stored, and the transformation vector ($T^i$, $T^j$, $T^k$) which comprises information about how the data values of the selected regions were altered when they were stored in the corresponding region.

The sampling circuitry 58 uses the position of the source sample in the selected region and the position (x,y,z) of the corresponding region in the atlas texture 86 to determine a position of an atlas sample point in the atlas texture 86. The atlas texture point occupies a position within the corresponding region that corresponds to the position of the source sample in the selected region.

At stage 92, the GPU 60 samples the atlas texture 86 at the determined position of the atlas sample point to obtain a value for the atlas sample. The GPU 60 samples both the red channel and the green channel of the atlas texture 86 at the atlas sample point. For each channel, the value for the atlas sample in that channel is obtained by interpolating neighboring data values in that channel of the corresponding region.

When sampling from a texture, the GPU 60 is configured to perform interpolation very quickly. The sampling of the atlas sample in the atlas texture 86 may be performed more quickly than if the source sample were to be sampled when stored in the memory 52. The GPU 60 is also configured to perform a large number of samples in parallel.

The data stored in the corresponding region of the atlas texture 86 may be an altered version of the data stored in the selected region. The sampling circuitry 58 obtains the desired source sample by transforming the atlas sample using the transformation vector ($T^i$, $T^j$, $T^k$) for the selected region.

In the present embodiment the sampling circuitry 58 transforms the atlas sample using the following equation:

$$S_{source} = T^i * S_{atlas}^r + T^j * S_{atlas}^g + T^k \qquad \text{(Equation 1)}$$

$S_{source}$ is the value for the desired sample point in the selected region of the data volume 82. $S_{atlas}^r$ is the value of the red channel of the atlas texture 86 at the atlas sample point. $S_{atlas}^g$ is the value of the green channel of the atlas texture 86 at the atlas sample point. ($T^i$, $T^j$, $T^k$) are the transformation weights stored in the transformation table 88 for the selected region.

$S_{source}$ is obtained by multiplying the value of the red channel at the atlas sample point by $T^i$, multiplying the value of the green channel at the atlas sample point $T^j$, adding together the resulting values, and then adding the numerical offset weight $T^k$. It is therefore possible to obtain a single source sample $S_{source}$ using data stored in both the red and green channels of the corresponding region.

In some embodiments (for example, in embodiments in which compression is used) a scaling factor is stored. In some embodiments $T^k$ may be scaled by the scaling factor before $T^k$ is added or subtracted.

At stage 94, the value $S_{source}$ for the sampled point is returned by the sampling circuitry 58.

Sampling as described above with reference to FIG. 5 may be performed on many sample points simultaneously by using the parallel capability of the GPU 60. In the present embodiment, many sample points are obtained for the various selected regions.

The rendering circuitry 59 renders an image for display using the values obtained for the sampled points of the selected regions. The image for display may be referred to as a desired frame. The image is the frame for which regions were selected at stage 74 of the process of FIG. 4.

The rendering may comprise any suitable form of rendering, for example MPR (multiplanar reconstruction) reformatting, MPR slab reformatting, CPR (curved MPR), IP (intensity projection) volume rendering, shaded volume rendering, or global illumination based volume rendering. The rendering may comprise multimodality rendering, for example multimodality fusion.

The image rendered by the rendering circuitry 59 is displayed on the display screen 46.

In the description above relating to FIGS. 4 and 5, the process of storing data from selected regions in the atlas texture and obtaining source samples by sampling the atlas texture is described in general terms. In the present embodiment, 8 bit data, unsigned 16 bit data and signed 16 bit data are all stored in a single atlas texture by using different transformation vectors to store each data type. Data values may then be reconstructed from any of the 8 bit data, unsigned 16 bit data and signed 16 bit data by using the appropriate transformation vector.

We now describe in detail the storage of the 8 bit data, unsigned 16 bit data and signed 16 bit data. Different transformation weights are used for different types of data storage.

In the present embodiment, the atlas texture has two channels, red and green, each of which is configured to store 8 bit data.

Selected regions of an 8 bit data volume are stored in the atlas texture by storing the data from each selected region in a corresponding region of the atlas texture. In the case where the 8 bit data volume to be stored comprises only one channel of data, a selected region of that 8 bit data volume may be stored on a single channel of the corresponding region of the atlas texture. For example, where the selected region of the 8 bit data volume is stored on the red channel, $T^i$ may be set to 1, $T^j$ may be set to 0, and $T^k$ may be set to 0.

A source sample of a selected region of the 8 bit data may then be obtained by sampling the red channel of the atlas texture at a position of the corresponding region that corresponds to the position of the source sample in the selected region.

In the present embodiment, a selected region of a first 8 bit data volume is stored on the red channel of a corresponding region of the atlas texture 86 as described above (with $T^i=1$, $T^j=0$, $T^k=0$). A selected region of a second 8 bit data volume is then stored on the green channel of the same corresponding region. For example, a transformation vector of the selected region of the second 8 bit data volume may have $T^i=0$, $T^j=1$, $T^k=0$.

The second 8 bit data volume stored in the corresponding region may be unrelated to the first 8 bit data volume stored in the corresponding region. Since the number of channels of each data volume is less than the number of channels of the atlas texture 86, regions of the first 8 bit data volume may be interleaved with regions of the second 8 bit data volume, for example by using channel packing. Channel packing may comprise the interleaving of several independent components into one image.

The selected region of the first 8 bit data volume and the selected region of the second 8 bit data volume are stored in the same corresponding region by using different transformation vectors to retrieve data from different channels of the corresponding region.

In further embodiments, two (or more) selected regions of the same data volume may be stored in the same corresponding region by using interleaving. In other embodiments, more than two selected regions may be stored in a given corresponding region of the atlas texture. For example, the atlas texture may comprise more than two channels and data from a different selected region may be stored on each of the channels.

Figure 6:
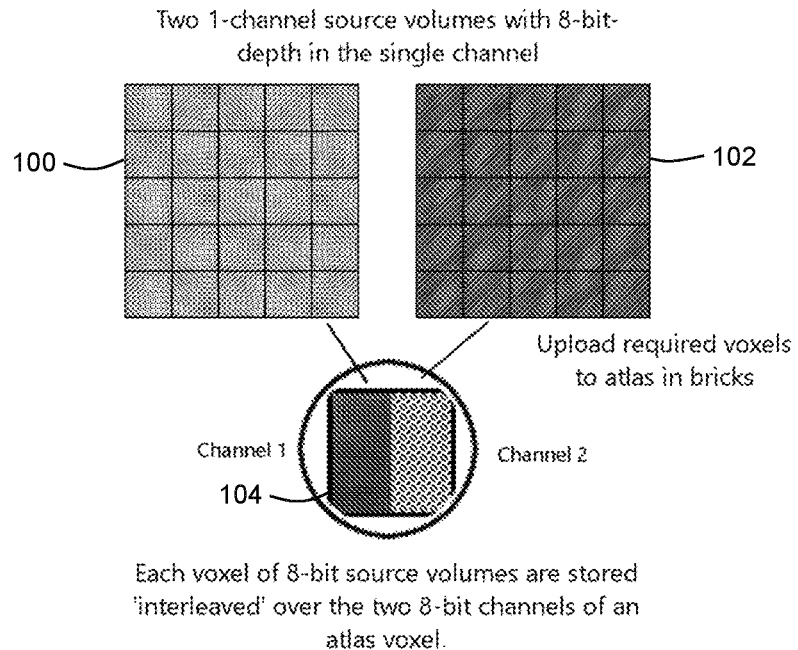
FIG. 6 is a schematic diagram of an interleaving process.

FIG. 6 is representative of two 1-channel source volumes 100, 102 each having an 8 bit depth in the single channel. Required voxels are uploaded into an atlas texture in bricks. One brick 104 of the atlas texture is illustrated in FIG. 6. The brick 104 has two channels, one of which stores voxels from the first source volume 100 and the other of which stores voxels from the second source volume 102. Each voxel of the 8-bit source volumes 100, 102 is stored interleaved over the two 8-bit channels of an atlas voxel.

We turn now to the storage of selected regions of unsigned 16 bit data in the atlas texture 86 of the present embodiment. We refer to the flow chart of FIG. 4 to describe the steps performed in storing selected regions of the unsigned 16 bit data.

At stage 70, an unsigned 16 bit data volume is received by the CPU 50. At stage 72, the selection circuitry 56 divides the unsigned 16 bit data volume into regions. At stage 74, the selection circuitry 74 selects the regions of the unsigned 16 bit data volume that are needed to render a desired frame.

At stage 76, the weighting circuitry 57 uploads each of the selected regions to a respective corresponding region of the atlas texture. We now consider how a selected region of the 16 bit data volume is stored in the corresponding region of the atlas texture, which has two 8 bit channels. The selected region of the 16 bit data volume is stored in a corresponding region of the atlas texture by exploiting factorization of linear interpolation.

The linear interpolation function S(v) has the form:

$$S(v)=(1-v)*x_1+v*x_2 \quad \text{(Equation 2)}$$

S(v) is a sample value at a sample point. The sample point lies between two neighboring points $x_1$ and $x_2$. $x_1$ and $x_2$ are the nearest neighbors on each side of the sample point.

The sample point lies at a position v which is expressed as a fraction of the distance between $x_1$ and $x_2$. A distance between $x_1$ and the sample point is v times the distance between $x_1$ and $x_2$. A distance between the sample point and $x_1$ is $(1-v)$ times the distance between $x_1$ and $x_2$.

The sample value at the sample point S(v) may be obtained by multiplying the sample value at $x_1$ by $(1-v)$, multiplying the sample value at $x_2$ by v, and summing the resulting values.

The property of linear interpolation is used to allow data from a selected region of the 16 bit data volume to be split across two 8 bit channels of the corresponding region of the atlas texture.

If a source point $x_i$ is split across two texture channels $x_i^r$ and $x_i^g$ such that $x_i=x_i^r+x_i^g$ then the interpolation function becomes:

$$S(v)=(1-v)*x_1^r+v*x_2^r+(1-v)*x_1^g+v*x_2^g \quad \text{(Equation 3)}$$

if the result of each channel-specific interpolation is summed.

Equation 2 may be simplified to:

$$S(v)=(1-v)*(x_1^r+x_1^g)+v*(x_2^r+x_2^g) \quad \text{(Equation 4)}$$

which is equal to Equation 2 by substitution.

If data values in a selected region of the 16 bit data volume are split across two channels in an appropriate manner, a sample value in the selected region may be obtained by sampling each channel of the corresponding region of the atlas texture and summing the results.

Although the example of interpolation above is given for interpolation in one dimension, similar considerations apply to higher dimensional interpolation, for example interpolation in 2, 3 or more dimensions. It is possible to factorize data values into two or more channels, interpolate them separately, and then combine the resulting sample values.

At stage 76, the weighting circuitry 57 divides each 16 bit data value into 8 high bits and 8 low bits. The 8 high bits are stored in one channel (for example, the red channel) of the corresponding region. The 8 low bits are stored in another channel (for example, the green channel) of the corresponding region.

At stage 78, the weighting circuitry 57 stores a position for the corresponding region, and a transformation vector $T^i$, $T^j$, $T^k$. In the example in which the 16 bits are divided into 8 high bits in the red channel and 8 low bits in the green channel, $T^i=256$, $T^j=1$, and $T^k=0$.

Turning to FIG. 5, at stage 90 a position of a desired sample in the selected region of the 16 bit data volume is determined by the sampling circuitry 58. The sampling circuitry 58 determines an atlas sample point in the atlas texture 86 using the position of the desired sample in the selected region and the position stored for the corresponding region.

At stage 92, the sampling circuitry 58 samples the red channel and the green channel of the atlas texture at the atlas sample point.

The sampling circuitry 58 obtains a value for the desired sample using Equation 1:

$$S_{source}=T^i *S_{atlas}^r + T^j *S_{atlas}^g + T^k \quad \text{(Equation 1)}$$

The sample of the red channel $S_{atlas}^r$ is multiplied by 256, which moves it into the 8 high bits of a 16 bit number. The sample of the green channel $S_{atlas}^g$ is multiplied by 1, which provides the 8 low bits. By summing the resulting sample values, a sample of the 16 bit region is obtained.

A sample of the 16 bit data volume is thereby obtained by sampling factorized data stored in two 8 bit channels. It is possible to store a 16 bit data volume in two 8 bit channels, interpolate each of the channels independently, and recombine the channels to obtain a 16 bit sample. A 16 bit number may be interpolated correctly by interpolating the high and low bytes independently then recombining them. In further embodiments, the high and low bytes may be stored in different corresponding regions. In other examples, any data may be factorized into two or more channels and sampled using the properties of linear interpolation.

Figure 7:
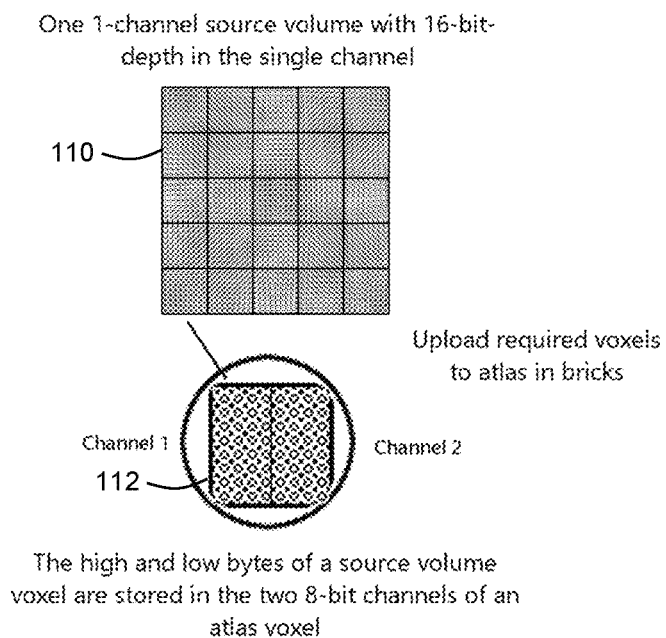
FIG. 7 is a schematic diagram of a factorization process.

FIG. 7 is representative of storage of one 1-channel source volume 110 which has 16 bit depth in its single channel. Required voxels of the source volume 110 are uploaded to an atlas texture in bricks. One brick 112 of the atlas texture is represented in FIG. 7. The high and low bytes of each source volume voxel are stored in the two 8-bit channels of an atlas voxel.

We now turn to storage of signed 16 bit data in the atlas texture 86. Signed 16 bit data has a range of −32768 to +32767 while unsigned 16 bit data has a range of 0 to 65535

A signed 16 bit data volume is received by the region selection circuitry 56, which selects a plurality of regions. Each selected region of the signed 16 bit data volume is converted to unsigned 16 bit data for storage. The signed 16 bit data is altered by being offset by +32768 to obtain unsigned 16 bit data. The resulting unsigned 16 bit data is factorized and stored in two channels as described above.

A sample of a selected region of the signed 16 bit data volume is obtained by obtaining samples of the two channels as described above, then applying an offset value of $T^k=-32768$ to recover signed data from unsigned data. The use of a transformation vector allows signed data to be offset into the unsigned range for storage in the atlas, then corrected back to signed upon sampling.

In the present embodiment, at least one selected region of a 16 bit data set is compressed into a single 8 bit channel of the atlas texture 86 for storage.

In some circumstances, a selected region of a 16 bit data volume contains only 8 (or fewer) bits of information. For example, 8 of the 16 bits may always store zeros. It may be said that the selected region contains only 8 significant bits.

We consider the case in which the selected region contains only 8 bits of information. The weighting circuitry 57 obtains a minimum data value for the selected region, for example a minimum intensity value. The weighting circuitry 57 stores the minimum value for the selected region in the $T^k$ element of the transformation vector. The weighting circuitry 57 alters the data values in the selected region by subtracting the minimum value from each of the data values, and stores the altered values in a corresponding region of the atlas texture 86. The data values stored in the corresponding region each comprise a difference between the data value in the selected region and the minimum data value of the selected region (which may also be described as an offset).

The data values in the corresponding region are 8 bit data values. There is thereby provided a lossless compression of 16 bit data into an 8 bit atlas texture.

In some embodiments, selected regions of a 16 bit data volume are stored in an 8 bit channel of a corresponding region by performing a lossy compression. In the present embodiment, lossy compression is avoided because the data to be stored is medical imaging data, which is conventionally stored without compression. In other embodiments, any kind of compression may be used on any kind of data.

We describe an example of lossy compression of a selected region of a 16 bit data volume. In the lossy compression, the 16 bit data contains more than 8 bits of information, so information is lost by compressing from 16 bits to 8 bits.

The weighting circuitry 57 obtains a minimum data value and maximum data value for the selected region, for example minimum and maximum intensity values. The weighting circuitry 57 stores the minimum value as the $T^k$ element of the transformation vector. The weighting circuitry 57 obtains a difference between the minimum value and the maximum value. The weighting circuitry 57 chooses a scaling factor such that the difference between the minimum value and maximum value is represented by 8 bits. The scaling factor is stored in either $T^i$ or $T^j$ as appropriate. For example, if the data is to be stored in the red channel, the scaling factor is stored in $T^i$.

Data values stored in the corresponding region are altered by subtracting the minimum value and scaling the data values using the scaling factor. Samples of the selected region are obtained by sampling the red channel, multiplying by the scaling factor $T^i$, and adding the numerical offset value $T^k$ which is the minimum value. Since more than 8 bits of information were compressed into an 8 bit channel, the data recovered by sampling has lost information. The data compression is lossy. The resolution of the data is reduced. However, the loss of information by compression may be considered to be a controllable loss of information.

In some embodiments, some selected regions of a 16 bit data volume are stored by factorization across two channels and other selected regions of the 16 bit data volume are stored in a single channel. In some embodiments, regions of one 16 bit data volume are factorized across two channels, while regions of a different 16 bit data volume are stored by compression in a single channel. In some embodiments, some selected regions are stored by lossless compression and some by lossy compression. For example, selected regions from one 16 bit data volume may be stored by lossless compression, and selected regions from another 16 bit data volume may be stored by lossy compression. Whether compression is used may depend, for example, on the type of data that is being stored.

In some embodiments, some selected regions of a given data volume are stored by lossless compression and others by lossy compression. Lossless and lossy regions may be selected based on a concept of saliency. For example, regions that are considered to be more important may be stored using lossless compression while regions that are considered to be less important may be stored using lossy compression. Regions of lossy compression may be selected based on, for example, entropy, tissue classification or gaze.

In some embodiments, regions of some tissue types are stored using lossless compression, and regions of other tissue types are stored using lossy compression. Depending on the application, some tissue types may be of less interest than other tissue types. In some circumstances, soft tissue that is not part of an organ (for example, muscle or fat) may be of less interest than soft tissue that is part of an organ. In some embodiments, data representative of muscle and/or fat is stored using lossy compression and data representative of organ tissue is stored using lossless compression. In further embodiments, data representative of vessels is stored using lossless compression and data representative of at least some non-vessel tissue is stored using lossy compression. In other embodiments, data representative of bone is stored using lossless compression and data representative of at least some non-bone tissue is stored using lossy compression.

In some embodiments, regions having higher entropy are stored using lossless compression and regions having lower entropy are stored using lossy compression. Higher entropy may correlate with regions that may be considered to be interesting. It may be desired to preserve interesting regions in the highest detail.

In some embodiments, a part of the image that the user is looking at is stored with higher accuracy (less compression). In further embodiments, the system predicts what the user will look at and preserves those regions more.

In the present embodiment, some regions of constant data are stored without a memory footprint by use of a transformation vector. For example, consider a case in which a whole selected region has a constant data value of 100. The weighting circuitry 57 does not upload the selected region to the atlas texture at stage 76 of FIG. 4. At stage 78, the weighting circuitry 57 stores an arbitrary position (x,y,z) which may be the position of any corresponding region, in which any data may be stored.

The weighting circuitry 57 stores a transformation vector ($T^i$, $T^j$, $T^k$) in which $T^i=0$, $T^j=0$, $T^k=100$. No matter which position is stored, the transformation vector will return a value of 100 for each data value in the selected region when the selected region is sampled using the method of FIG. 5.

The constant value may be any suitable numerical value. For example, in some circumstances the constant value may be 0. Constant data, for example padding, may be reduced to have no memory footprint by storing as a constant value in the $T^k$ transformation element.

In addition to clinical medical imaging data acquired from scanners, additional imaging data may be obtained by processing scanner data. For example, segmentation data may be obtained. Segmentation data is typically 8 bit. In some embodiments, segmentation data may be stored in the same atlas texture as imaging data. The segmentation data may be stored in any one of the atlas channels. Other channels may be ignored by masking to zero.

In general, segmentation data may be treated in the same manner as other volume data. In some circumstances, the segmentation data may be representative of labels that have been assigned to pixels or voxels. In some embodiments, pixels or voxels may be assigned numerical labels, for example 1=bone, 2=kidney, 3=brain. In such embodiments, the texture may not be interpolated. Interpolating numerical label values may lead to incorrect or misleading labels. For example, a point that it is positioned midway between a voxel of bone (label 1) and a voxel of brain (label 3) should not be given a label value of 2 (which would incorrectly indicate a voxel of kidney).

Although the embodiment above is described in terms of two data channels (red and green, having channel weights $T^i$, $T^j$), in other embodiments any suitable number of channels may be used. For example, four channels (red, green, blue and alpha) may be used. Each channel may have an associated channel weights. Some channel weights may be set to zero to block out unwanted channels.

We have described above a method by which multiple types of data may be stored in a single atlas texture. The alas texture may be described as a heterogeneous atlas. 8 bit, 16 bit signed and 16 bit unsigned data are stored in the same GPU texture allocation. The transformation vector is used to dynamically alter how the atlas sample is interpreted by the GPU, without branching. The method supports multimodality data and segmentation. The method may be applied to data of any appropriate dimensionality, for example 2D or 3D data.

The GPU 60 is configured to perform a certain limited number of operations on RGBA data very quickly. By using the method above, the GPU 60 may be used to perform data processing of any one or more of a range of data types. Textures may be sampled quickly by using caching and dedicated interpolation hardware.

In general, interpolation may be performed by the GPU in a format that is controlled by the GPU and may not be modified. By using different transformation vectors, multiple types of data may be stored in a single, fixed format atlas texture stored in graphic memory of a GPU.

By using the method described above with reference to FIGS. 4 and 5, different types of data may be stored in the same atlas texture. The ability to store different data types may be particularly relevant to clinical data. Clinical data may come in multiple varieties. For example, data may be 8 bit or 16 bit. Data may be signed or unsigned. Different vendors and/or modalities may use different data types. Multimodality viewers may require simultaneous compatibility with all the types of data that are commonly available in different modalities or from different vendors.

The use of the memory in imaging may allow improved real time processing to be performed. For example, large imaging volumes may be processed in real time. Multimodality data may be processed in real time. A frame rate of real time imaging may be improved by reducing the time taken to render each frame.

Data may be processed using a GPU that is not large enough to hold the entirety of the data set or data sets to be processed. The GPU may be smaller than a CPU memory that is used to store the data sets. The use of the atlas texture may enable efficient processing of the relevant regions of one or more data sets.

By adding weighted factorized interpolation to multimap based texture atlases, dynamic data management for volume rendering may be turned into a fixed function solution suitable for GPU rendering. Multiple data types may be stored in the same atlas. A block specific transform may be applied to an atlas sample to get a desired result. Multimodality data may be stored in the same structure without reallocation or logical branching.

The system may have an extremely low allocation churn. The system may have a very distinctive texture signature. The system may be able to render with a lower texture budget than some known solutions, especially in extreme cases.

One common operation is called windowing. Windowing comprises moving the range of values to which a preset applies. Windowing is quite common, because even calibrated devices have slightly different outputs. When windowing a preset, material may shift in and out of view.

In a traditional system, lots of data may lead to large allocations. As data is windowed out of view, it may be deallocated. In the system described above, no such allocation and deallocation may take place.

An example of an extreme case may be a homogeneous dataset in which all voxels have the same value. In this case even extremely large datasets may be rendered on the GPU with ease. Another example may be a segmented dataset where the segmented object is small, but the actual dataset is large. In this case very little GPU memory may be needed to render what is actually a large data volume.

The method described above may be desirable for large volumes with increased matrix size. The method described above may be desirable for multi-modality applications.

CT volumes may be mixed signed/unsigned 16 bit. Ultrasound data may be unsigned 8 bit. X ray may be unsigned 8 bit. PET or SPECT may be unsigned 16 bit. Processed data (for example, segmentation data) may be floating point. By storing multiple types of data in a single atlas texture, faster and/or more efficient processing of the data may be performed. Increasing a speed at which data is sampled may allow faster rendering of images, for example rendering of images in real time. Images may be rendered form large data sets.

For example, in multimodality fusion imaging, an image is rendered from data of two or more different imaging modalities. Multimodality fusion may require large amounts of data with a mixture of data types. Storing data from different modalities in a single atlas texture may increase the speed at which multimodality rendering can be performed.

Some existing solutions for storage of imaging data may be statically typed. Different types of data may be stored using distinct atlases, for example a first atlas for 8 bit data, a second atlas for unsigned 16 bit data and a third atlas for signed 16 bit data. Distinct atlases plus dynamic GPU branching may be used to support the three needed datatypes. GPU branching may be a situation in which a GPU makes a decision during GPU runtime. GPU branching may be costly. GPU branching may be costly due to the parallel architecture of GPUs.

Branching may be expensive in the GPU because many threads of execution may need to execute the same sequence of instructions. For example, within one of these sets of threads, a sequence may specify that if a condition is met, operation A is to be performed, and if the condition is not met, operation B is to be performed. If any of the threads have a different value for the condition compared to the rest, then all the threads may have to do both A and B. If there is a chance that divergence can happen, the program may have to allocate enough resources to accommodate the computation of both A and B.

In general, GPUs work by executing the same algorithm simultaneously on different inputs. In hardware, a GPU may comprise a number of SM (streaming multi-processors), each of which executes simple arithmetic instructions in parallel with the others. A GPU may organize its SMs in such a way that the SMs are not fully independent. The SMs are grouped together and each SM in the group executes exactly the same arithmetic or logical operation as every other SM in the group.

If a logical test results in some of the SMs taking one branch, and some others taking another, the SMs may not be able to execute different operations since this would cause the SMs to fall out of sync with each other. In the case of such a logical test, the GPU typically executes both sides of the branch on all the SMs. The GPU then masks out the results in the SMs that did not take the branch containing the current instruction. Such branching may be highly inefficient. Branches may be avoided when at all possible. In particular branches may be avoided if they may lead to desynchronized SM groups (which may also be referred to as warp divergence).

Even in cases where the branch is predictable enough that the SMs do not need to diverge from each other, the presence of a runtime branch may often cause a compiler optimizer to produce slower code, as it has to account for the possibility that the branch will happen.

The method described above with FIGS. 4 and 5 may adapt to a change in relative proportions of different data types. Different data types may be stored in the same atlas texture by using different transformation vectors. It may be possible to change the type of data that is stored in any given region of the atlas texture.

The relative proportions of each data type (for example, 8 bit, 16 bit signed, 16 bit unsigned) may change over time. Existing solutions that use a different atlas texture for each data type may need to re-assign one or more atlases to account for a change in proportions of different data types. It may be very costly to re-assign atlases regularly at run-time.

In some circumstances, micro-atlases may be used. For example, multiple atlases per data type may be used. However, the use of micro-atlases may worsen a GPU branching cost.

In some embodiments, the method described above with relation to FIGS. 4 and 5 is used in a scenario in which there are multiple users per server. For example, multiple users may share the use of one GPU. The amount of space on the GPU that one user can access may be limited. The compression and predictable allocation behavior of the method described above may be useful when trying to fit as many users as possible per GPU. The incremental upload may make it easier to move a user from one graphics card to another.

In some existing systems, the process of moving a user from one GPU to another may require each byte to be copied and re-uploaded to the destination GPU. If a user needs to be moved to a different card, a non-atlas implementation may require any currently used volumes to be freed, and completely re-uploaded to the new destination card. This may result in a long delay until the first image is produced on the destination GPU.

The system described above may only require the minimal state required to render the image to be present on the GPU which means that only a subset may be required to be copied and re-uploaded. With the atlas system it may not be necessary to perform a full upload step before rendering can start. Instead only the regions of the volume that are required for rendering are uploaded.

In some embodiments, a single atlas texture may be used for multiple users and/or multiple applications.

In some embodiments, multiple atlases are used on multiple GPU cards or machines. In some circumstances, datasets may be so large that multiple GPUs are used to hold enough data to render the dataset efficiently. In general, a machine may hold up to 4 GPUs. If more than 4 GPUs are to be used, multiple machines may be used to provide a system with very large resident memory capacity.

In some embodiments, data is divided into independent regions that each are rendered and stored on a separate GPU or machine. The partial results from each GPU or machine are forwarded to a master GPU or machine. The master GPU or machine combines the partial results into one resulting image.

The use of multiple GPUs and/or machines may allow the system to handle more data at better performance.

Data may be preloaded into an atlas based on prior usage statistics. For example, the system may track the number of times a given block (having a given data range and position) is used. If the block is used often, it may be determined that the likelihood of that block being used is high. The system may choose to pre-emptively upload that block if it has spare capacity and/or bandwidth. If the block is used, upload time may be saved. If the block is not used, it may be the case that only idle resources have been wasted.

In some embodiments, a volume that is always used for a specific segmentation is pre-loaded with the data for that segmentation. In some embodiments, all non-air source data is pre-loaded.

Time to first image may be reduced by front loading as little as possible. The use of an atlas may help to reduce time to first image as it allows rendering from a subset of the full data.

Embodiments are described in which multiple data types are stored in a single atlas texture. In other embodiments, a single data type may be stored in a given atlas texture. The number of data types stored in a given atlas texture may vary over time. The relative proportions of different types of data in a given atlas texture may vary over time.

In some embodiments, a user may have several datasets loaded in one scene (for example, for use in data fusion). A dataset of one datatype may be dynamically replaced with a dataset using a different datatype.

Completely altering the source data (selecting a different volume) may have improved performance in the atlas system, since it may benefit from incremental uploading in which only needed regions are uploaded.

Particular weights and values for those weights are described above. In further embodiments, any combination of weights may be used. Any values for those weights may be used. Any suitable equation may be used to transform sampled data using the stored weights.

The method above is described as being run on a GPU. In practice, the method may be applicable to any device on which interpolation is constrained. The method may be applicable to any device in which an explicit hardware resource is configured to provide fast interpolation by constraining the flexibility of the data source and/or data layout. For example, the device may comprise an FPGA with on-board memory. The method may be applicable to any situation in which data is to be processed using a memory that is not large enough to store the entirety of the data. The method may be applicable to any situation in which multiple types of data (for example, multimodality data) is to be stored and processed.

Reference is made above to the storage of regions of an imaging data set. The regions of the imaging data set may be parts of the imaging data set that are each representative of a respective part of a physical scan volume. The regions of the imaging data set may therefore be representative of regions in physical space. The regions of the imaging data set may be stored in the CPU memory in any suitable manner such that the spatial relationship between the regions is known. When data from the regions of the imaging data set is stored in the GPU memory, it may be stored in any suitable manner. In some circumstances, data from adjacent regions of the imaging data set may be stored in non-adjacent regions of the GPU or vice versa. The spatial relationship between the regions may be inferred using the transformation table which maps regions of the imaging data set stored in the CPU memory to corresponding regions of the multi-channel atlas texture stored in the GPU memory.

Although the embodiments above are described with regard to medical imaging data, in other embodiments any data may be stored and/or rendered using methods described above. For example, the data may comprise oil and gas data. The data may comprise three-dimensional microscopy data. The data may comprise, for example, climate data, geological surveys, demographics or games data. The methods may be used in any application for which fast parallel sampling is used, for example fast parallel sampling of different data types. The methods may be used for any application that involves visualizing (or operating on) large amounts of data with differing datatypes.

Certain embodiments provide an image processing apparatus comprising processing circuitry configured to: acquire first image data and second image data whose data type are different from the first image data; generate a multi-channel atlas texture which includes data based on the first image data and the second image data, and the data whose data type is different from at least one of the first image data or the second image data; generate a transformation table which includes a weighted factor to transform the first image data and the second image data into the multi-channel atlas texture; restore the data included in the multi-channel atlas texture to the first image data or the second image data based on the weighted factor.

Certain embodiments provide a volume imaging method comprising: one or many data sources of different value type, dimensions and update frequency; a multi-channel atlas texture; a set of channel reconstruction weights; and GPU interpolation hardware, in which the interpolation is factorized and weighted to reconstruct any given data source from the heterogeneous atlas.

The channel reconstruction weights may be used to compress and reconstruct the data without loss of data. The channel reconstruction weights may be used to compress and reconstruct the data with a controllable loss of information.

The reconstructed value may be used in either MPR reformatting, MPR SLAB reformatting, CPR, IP volume rendering shaded volume rendering or Global illumination based volume rendering.

The value type is may be a signed or unsigned integer type, a fixed point real type or a color type.

The lossy region may be selected based on a concept of saliency like entropy, tissue classification or gaze.

Data from multiple atlases may be used on multiple GPU cards and/or machines. Data may be preloaded into the atlas based on prior usage statistics.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A data processing apparatus comprising:
a first memory configured to store at least one data set;
a second memory configured to store a multi-channel atlas texture; and
processing circuitry configured to:
store at least one region of the at least one data set in one or more corresponding regions of the multi-channel atlas texture by altering data values of the at least one region of the at least one data set in accordance with a transformation vector comprising at least one channel weight and/or at least one numerical offset value; and
reconstruct data values from the altered data values by transforming the altered data values using the transformation vector.

2. An apparatus according to claim 1, wherein the first memory comprises or forms part of a memory of a central processing unit (CPU) and the second memory comprises or forms part of a graphics memory of a Graphics Processing Unit (GPU).

3. An apparatus according to claim 1, wherein
the at least one data set comprises medical imaging data acquired using a medical imaging scanner;
the at least one region of the at least one data set comprises a part of the at least one data set to be used in rendering a medical image; and
the processing circuitry is configured to render a medical image by sampling the one or more corresponding regions,
such that the medical image is rendered without storing the entirety of at least one data set in the second memory.

4. An apparatus according to claim 1, wherein:
the at least one data set comprises a first data set having a first data type and a second data set having a second data type;
the processing circuitry is configured to store a region of the first data set in a first corresponding region of the multi-channel atlas texture by altering data values of the first data set in accordance with a first transformation vector; and
the processing circuitry is configured to store a region of the second data set in a second corresponding region of the multi-channel atlas texture in accordance with a second transformation vector,
such that different data types are stored in the same multi-channel atlas texture.

5. An apparatus according to claim 4, wherein:
the first data type comprises a first one of 8 bit data, unsigned 16 bit data, signed 16 bit data; and
the second data type comprising a second, different one of 8 bit data, unsigned 16 bit data, signed 16 bit data.

6. An apparatus according to claim 1, wherein the multi-channel atlas texture is configured to contain data of a single data type,
the at least one region of the at least one data set comprises data having a different data type; and
the altering data values of the at least one region of the at least one data set comprises converting the data type of the at least one region into the single data type of the multi-channel atlas texture.

7. An apparatus according to claim 1, wherein the transforming of the altered data value using the transformation vector comprises, for at least one channel of the one or more corresponding regions, multiplying the altered data in the or each channel by a respective channel weight of the transformation vector and/or offsetting the altered data in the or each channel by a respective numerical offset value of the transformation vector.

8. An apparatus according to claim 1, wherein at least one of a) and b):
a) the processing circuitry is configured to obtain a sample of the at least one region by sampling the one or more corresponding regions to obtain at least one atlas sample and transforming the at least one atlas sample using the transformation vector, wherein the sampling comprises linear interpolation; and
b) the transformation vector comprises channel weights $T^i$ and $T^j$ and a numerical offset value $T^k$, the or an at least one atlas sample comprises a first sample $S_{atlas}^1$ of a first channel of the multi-channel atlas texture and a second sample $S_{atlas}^2$ of a second channel of the multi-channel atlas texture, and the or a sample $S_{source}$ of the at least one region is obtained using the equation:

$$S_{source} = T^i * S_{atlas}^1 + T^j * S_{atlas}^2 + T^k.$$

9. An apparatus according to claim 1, wherein at least one of a) and b):
a) the processing circuitry is configured to store the transformation vector in the second memory; and
b) the processing circuitry is configured to store the transformation vector in a transformation table.

10. An apparatus according to claim 1, wherein the altering of the data values of the at least one region comprises factorizing each data value into a respective first and second data value, and wherein the processing circuitry is configured to store the first data values in a first channel of the one or more corresponding regions and to store the second data values in a second channel of the one or more corresponding regions, wherein the multi-channel atlas texture is configured to contain data of having a first number of bits; the data values of the at least one region have a second, larger number of bits; and the factorization is such that the first and second data values each have the first number of bits.

11. An apparatus according to claim 1, wherein:
the multi-channel atlas texture is configured to contain data of having a first number of bits; the data values of the at least one region have a second, larger number of bits; and the altering of the data values of the at least one region comprises offsetting the data values in accordance with a numerical offset value of the transformation vector, so as to providing a lossless compression of the data values.

12. An apparatus according to claim 1, wherein at least one of a), b) and c):
a) the multi-channel atlas texture is configured to contain data of having a first number of bits, and the data values of the at least one region have a second, larger number of bits;
b) the altering of the data values of the at least one region comprises offsetting the data values by a numerical offset factor and multiplying by a scaling factor, thereby providing a lossy compression of the data values; and
c) the processing circuitry is further configured to select lossy compression of at least one region based on at least one of: entropy, tissue classification, and gaze.

13. An apparatus according to claim 1, wherein at least one of a) and b):
a) the at least one region comprises signed data, and wherein the altering of the data values of the at least one region comprises offsetting the data values such as to convert the signed data to unsigned data; and
b) the processing circuitry is further configured to store a region of constant data in the one or more corresponding regions of the multi-channel atlas texture by storing a further transformation vector, the further transformation vector comprising at least one channel weight that equals zero; and the processing circuitry is configured to apply the transformation vector to the altered data values stored in the one or more corresponding regions to obtain constant data values by multiplying the altered data values by the zero channel weight or weights.

14. An apparatus according to claim 1, wherein at least one of a), b), c) and d):
a) the second memory comprises or forms part of a graphics card;
b) the second memory is configured to perform parallel interpolation operations;
c) the second memory is smaller than the first memory; and
d) the second memory is too small to store the entirety of the at least one data set.

15. An apparatus according to claim 1, the at least one data set comprising a first data set having a first data type and a second data set having a second, different data type, wherein at least one of a) to h):
a) the first data type has a different number of bits from the second data type;
b) the first data type is 8 bit data and the second data type is 16 bit data;
c) the first data type is signed and the second data type is unsigned;
d) at least one of the first data type and second data type is floating point;
e) at least one of the first data type and second data type is a signed or unsigned integer type;
f) at least one of the first data type and second data type is a fixed point real type;
g) at least one of the first data type and second data type is a color type; and
h) the first data set comprises or is representative of first imaging data obtained using a first imaging modality, and the second data set comprises or is representative of second imaging data obtained using a second, different imaging modality.

16. An apparatus according to claim 1, wherein the at least one data set comprises at least one of imaging data, medical imaging data, MM data, CT data, PET data, SPECT data, X-ray data, ultrasound data, segmentation data.

17. An apparatus according to claim 1, wherein the processing circuitry is further configured to render an image from the at least one data set, the rendering comprising sampling the altered data values in the one or more corresponding regions and transforming the sampled values using the transformation vector, wherein the rendering comprises at least one of: MPR (multiplanar reconstruction) reformatting, MPR slab reformatting, CPR (curved MPR), IP (intensity projection) volume rendering, shaded volume rendering, global illumination based volume rendering, multi-modality fusion rendering.

18. An apparatus according to claim 1, wherein at least one of a) to c):
a) the processing circuitry is configured to store a first plurality of regions having a first data type and a second plurality of regions having a second data type in the multi-channel atlas texture, wherein the relative sizes of the first plurality of regions and second plurality of regions stored in the multi-channel atlas texture vary over time;
b) the processing circuitry is further configured to store at least one further region of the at least one data set in the one or more corresponding regions of the multi-channel atlas texture, by storing the at least one region and the at least one further region in different channels; and
c) the apparatus further comprises a further memory configured to store a further atlas texture, wherein the processing circuitry is further configured to store a further region of the at least one data set in the further atlas texture.

19. An apparatus according to claim 1, wherein at least one of a) and b):
a) a single multi-channel atlas texture is configured to store a first plurality of regions for a first user, and to store a second plurality of regions for a second, different user;
b) a single multi-channel atlas texture is configured to store a first plurality of regions for use in a first application, and to store a second plurality of regions for use in a second, different application; and
c) data is preloaded into the multi-channel atlas texture based on prior usage statistics.

20. A method comprising:
storing at least one data set in a first memory;
storing at least one region of the at least one data set in one or more corresponding regions of a multi-channel atlas texture stored in a second memory;
wherein the at least one region of the at least one data set is stored in the one or more corresponding regions of the multi-channel atlas texture by altering data values of the at least one region of the at least one data set in accordance with a transformation vector comprising at least one channel weight and/or at least one numerical offset value; and
reconstructing data values from the altered data values by transforming the altered data values using the transformation vector.

21. A data processing apparatus comprising:
a first memory configured to store at least one data set;
a second memory configured to store a multi-channel atlas texture; and
processing circuitry configured to:
store at least one region of the at least one data set in one or more corresponding regions of the multi-channel atlas texture by altering data values of the at least one region of the at least one data set in accordance with a transformation vector comprising at least one channel weight and/or at least one numerical offset value;
store the altered data values in the one of more corresponding regions of the multi-channel atlas texture;
sample the stored altered data values to obtain a plurality of atlas samples; and
convert the atlas samples to source samples by applying the transformation vector to the atlas samples, wherein the source samples are representative of samples of the least one region of the at least one data set.

\* \* \* \* \*